United States Patent [19]
Popovic

[11] Patent Number: 6,091,761
[45] Date of Patent: Jul. 18, 2000

[54] DESPREADING METHOD AND ARRANGEMENT IN COMMUNICATION SYSTEM

[75] Inventor: Branislav Popovic, Solna, Sweden

[73] Assignee: Telefonaktiebolaget LM Ericsson, Stockholm, Sweden

[21] Appl. No.: 09/008,539

[22] Filed: Jan. 16, 1998

[30] Foreign Application Priority Data

Jan. 24, 1997 [SE] Sweden .................................. 9700212

[51] Int. Cl.$^7$ .................................................. H04L 27/30
[52] U.S. Cl. ........................................... 375/150; 375/142
[58] Field of Search .................................. 375/206, 200, 375/208, 130, 140, 142, 150, 147; 370/342, 209, 320, 335

[56] References Cited

U.S. PATENT DOCUMENTS

| | | | |
|---|---|---|---|
| 5,353,352 | 10/1994 | Dent et al. ................................ | 375/200 |
| 5,463,657 | 10/1995 | Rice ......................................... | 375/200 |
| 5,497,395 | 3/1996 | Jou .......................................... | 375/200 |

OTHER PUBLICATIONS

PCT International Search Report dated May 11, 1998.
International Search Report dated Nov. 4, 1997.

Primary Examiner—Stephen Chin
Assistant Examiner—Betsy L. Deppe
Attorney, Agent, or Firm—Burns, Doane, Swecker & Mathis, L.L.P.

[57] ABSTRACT

The invention relates to a method and an arrangement for implementing a bank of correlators, corresponding to a set of Orthogonal Gold codes, in a receiver used in a Direct Sequence Code Division Multiple Access system (DS-CDMA). The bank of correlators generates N correlation values ($CV_0, \ldots, CV_{N-1}$) from N received symbols ($s_0, s_1, \ldots, s_{N-1}$) in a sequence. The received symbol sequence ($s_0, s_1, \ldots, s_{N-1}$), where each symbol has been spread by an Orthogonal Gold code respectively, is buffered (401). The buffered symbol sequence is multiplied (402) element-by-element with an arbitrary sequence ($a_0, a_1, \ldots, a_{N-1}$), in order to obtain a set of products ($s_0 * a_0, s_1 * a_1, \ldots, s_{N-1} * a_{N-1}$). Said arbitrary sequence is the same sequence used when generating the Orthogonal Gold Codes. The set of products ($s_0 * a_0, s_1 * a_1, \ldots, s_{N-1} * a_{N-1}$) is then permuted (403) in order to obtain a sequence, which is equal to a sum of a number of sequences from a set of Walsh sequences. The sequence is then transformed (404) with Fast Hadamard Transform as to obtain said correlation values ($CV_0, \ldots, CV_{N-1}$)

11 Claims, 4 Drawing Sheets

DESPREADING METHOD AND ARRANGEMENT IN COMMUNICATION SYSTEM

This application claims priority under 35 U.S.C. §§119 and/or 365 to 9700212-5 filed in Sweden on Jan. 14, 1997; the entire content of which is hereby incorporated by reference.

TECHNICAL FIELD

The present invention relates generally to a method and an arrangement for despreading of a received signal in a multicode DS-CDMA system and more particularly it relates to a method and an arrangement for implementing a bank of correlators, corresponding to a set of Orthogonal Gold codes or alike, in a receiver used in a Direct Sequence Code Division Multiple Access system (DS-CDMA).

DESCRIPTION OF THE BACKGROUND ART

A spread spectrum communication system employing a direct sequence method, as for example DS-CDMA (Direct Sequence Code Division Multiple Access) system, utilises a method of generating from an information signal, a transmission signal, where the transmission signal have a significantly wide bandwidth with respect to the original information signal. This is a result of spreading the information signal by a high rate spreading sequence such as for example a high bit rate pseudo noise (PN) sequence. The digitised informational signal and the high rate spreading sequence are typically multiplied together. This combination is called coding or spreading the informational signal. A plurality of coded information signals are transmitted on a same radio frequency carrier wave and jointly received as a composite signal at a receiver. Each of the coded signals overlaps all of the other coded signals, as well as noise-related signals, in both frequency and time. By correlating the composite signal with one of the unique spreading sequences, the corresponding information signal can be isolated and decoded. Each information signal is thus allocated a unique spreading code and a receiver uses the same spreading code as that used in the transmitter to perform a despread operation.

Multicode transmission scheme is a method to provide high-rate and variable-rate data services in DS-CDMA systems without decreasing the processing gain or increasing the spreading bandwidth. In such a scheme several code channels are assigned to a single user. High-rate data stream is split into a number of parallel low-rate streams. These low-rate streams are spread by different sequences and added together before power amplification.

To avoid interference between different code channels of a single user, all spreading sequences (codes) should be orthogonal within data symbol duration. To make the other-user interference as a noise-like interference, each single users code channels are further multiplied by a user specific pseudorandom spreading sequence. The number of used orthogonal codes depends on the current data rate. The receiver will have an easier task if it knows which spreading codes are currently used, or at least knows the number of code channels.

An example of orthogonal sequences is a so-called Orthogonal Gold sequences. A set ($\hat{G}$) of Orthogonal Gold codes ($OG_0, OG_1, \ldots, OG_{N-1}$) with elements belonging to an alphabet of 0 and 1, is defined as a matrix obtained from a modulo-two summation (XOR) between each row of an orthogonal matrix ($\hat{M}$) and a sequence ($\hat{a}$), i.e.

$$\hat{G} = \begin{bmatrix} OG_0 \\ OG_1 \\ \ldots \\ OG_{N-1} \end{bmatrix} = \begin{bmatrix} \hat{a} \\ \hat{x}_1 \oplus \hat{a} \\ \ldots \\ \hat{x}_{N-1} \oplus \hat{a} \end{bmatrix} = \hat{M} \oplus \hat{a}$$

where $$\hat{M} = \begin{bmatrix} 0 & 0 & \ldots & 0 & 0 & 0 \\ x_1 & x_2 & x_3 & \ldots & x_{N-1} & 0 \\ x_2 & x_3 & x_4 & \ldots & x_1 & 0 \\ \ldots & \ldots & \ldots & \ldots & \ldots & \ldots \\ x_{N-1} & x_1 & x_2 & \ldots & x_{N-2} & 0 \end{bmatrix}$$

and $\hat{a} = [a_1\ a_2 \ldots a_{N-1}\ 0]$.

The orthogonal matrix ($\hat{M}$) is obtained from another matrix (M) consisting of all cyclic shifts of a first maximum length PN sequence (m-sequence) $\{X_k\}$, where $k=1, 2, \ldots, N-1$, by bordering the matrix (M) on the top with a row of zeros and on the right side by a column of zeros.

The sequence ($\hat{a}$) is another m-sequence $\{a_k\}$, where $k=1, 2, \ldots, N-1$, with a zero added on the right end. The sequences $\{X_k\}$ and $\{a_k\}$ should form a so-called preferred pair of m-sequences to obtain optimum periodic cross-correlation function. Optimum cross-correlation function is one which has minimum maximum value for a given sequence length and a given number of sequences.

However, the actual definition of the Orthogonal Gold sequences is more general, in the sense that the sequence ($\hat{a}$) can be an arbitrary sequence with zero at the right end. In that case the set of sequences ($\hat{G}$) would still be orthogonal but the periodic cross-correlation functions between the sequences from the set will not be optimum.

An equivalent definition of the set ($\hat{G}$) of Orthogonal Gold sequences with elements belonging to a alphabet of −1 and +1 can be obtained by mapping 0→1 and 1→−1, while the modulo two summation should be replaced by multiplication between row elements of the matrix $\hat{M}$ and elements of the sequence $\hat{a}$.

The usual receiver method for CDMA systems is so-called RAKE combining, which assumes weighted summation of separately despread multipath signal components, with appropriate compensation of corresponding components' delays.

In the multicode CDMA systems, the number of RAKE receivers needed for a single mobile-base station connection is equal to the maximum number of parallel code channels. As all RAKEs work in parallel, the baseband receiver consists of multiple despreaders, each corresponding to a different receiving path, and each consisting of a number of correlators corresponding to the different code channels.

The despreader implementation depends on the actual spreading method, i.e. which spreading sequence is used. If the spreading sequence is binary, with +1 and −1 elements, it is called Binary Phase Shift Keying (BPSK) spreading, while when the spreading method is complex, consisting of real and imaginary binary sequences it is called QuadraPhase Shift Keying (QPSK) spreading. Usually QPSK spreading is performed with different real and imaginary binary sequences.

The efficiency of the despreader for the multicode CDMA systems directly depends on a bank of correlators corresponding to the binary spreading sequences.

The maximum number of sequences in any orthogonal set is equal to the sequence length. Therefore, if the length of sequences is N, it is necessary to perform $N^2$ operations for each sample at the output of the bank of correlators.

An implementation of the bank of correlators which provides less than $N^2$ operations per output sample is an efficient implementation.

Two kinds of orthogonal sets of sequences are proposed for a Multicode DS-CDMA scheme; sets of Walsh sequences and sets of Orthogonal Gold sequences. A bank of correlators corresponding to a set of Walsh sequences can be efficiently implemented by using a Fast Hadamard Transform (FHT). In that, case the number of operations required for each output sample is $N \times \log_2 N$. An implementation of a bank of correlators corresponding to orthogonal Gold sequences that requires less than $N^2$ operations is also desirable.

SUMMARY OF THE INVENTION

The object of present invention is to solve the problem how to reduce the complexity of a bank of correlators matched to a set of Orthogonal Gold sequences.

Another problem which the invention is intended to solve is to reduce the power consumption in a receiver when despreading received radio signals.

In accordance with the present invention, the aforesaid problems are overcome and resolved by implementing the bank of correlators in a more efficient way compared to a straightforward implementation which uses a correlator for each Orthogonal Gold sequence.

The implementation of the bank of correlators is performed in the following way. Multiplying a received sequence element-by-element with an arbitrary sequence, that is used for generation of the orthogonal Gold sequences, as to obtain a set of products. The elements in the set of products are permuted according to a certain rule in order to obtain a permuted sequence which is equal to a sum of a number of sequences from a set of Walsh sequences. A Fast Hadamard Transform is then performed on said permuted sequence as to obtain correlation values between the received sequence and each possible Walsh sequence.

An advantage afforded by the present invention is that the number of operations used when despreading a received sequence are essentially decreased.

A further advantage afforded by the present invention is that due to the smaller number of operations during the despreading of received radio signals a reduction of power consumption is obtained.

Another advantage afforded by the present invention is smaller area needed for integrated circuit implementation of the aforementioned bank of correlators.

BRIEF DESCRIPTION OF THE DRAWINGS

The invention will now be described in more detail with reference to exemplifying embodiments thereof and also with reference to the accompanying drawings, in which.

DETAILED DESCRIPTION

Figure 1:
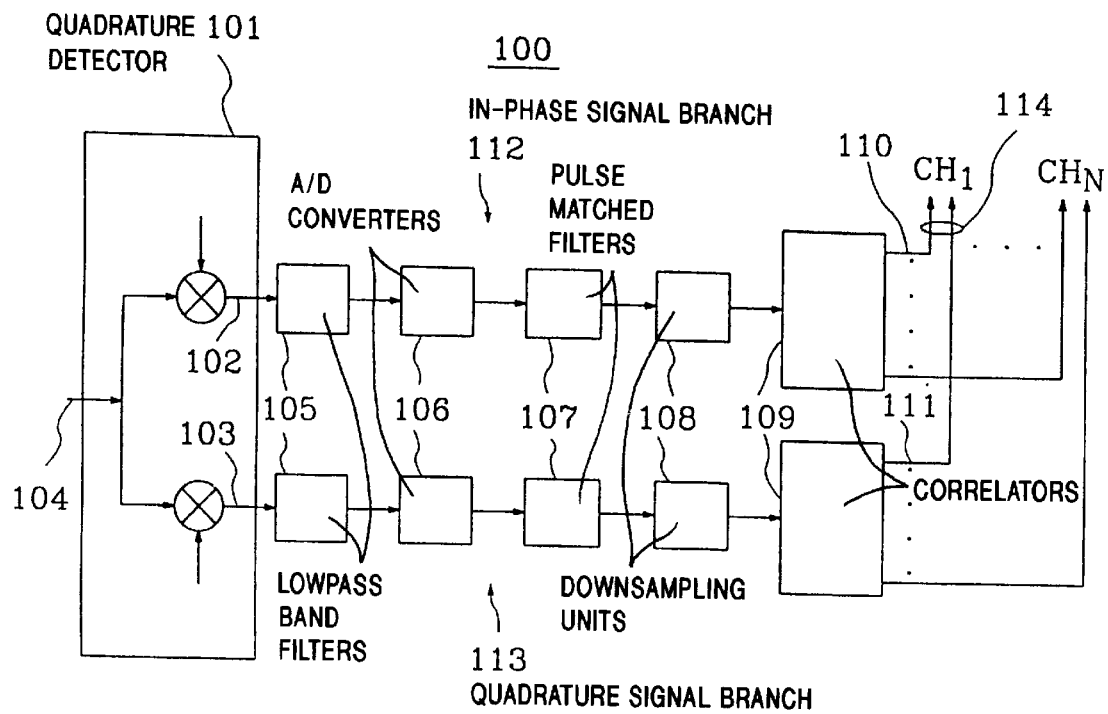
FIG. 1 is a block diagram illustrating a part of a receiver operable to receive a BPSK-spread signal used in a DS-CDMA system.

FIG. 1 illustrates a part of a receiver 100 used in a multicode DS-CDMA system. In a corresponding transmitter, all N transmitted code channels have been spread with a set of Orthogonal Gold sequences $G_0, G_1, \ldots, GN_{N-1}$ respectively, and utilising method called Binary Phase Shift Keying (BPSK). The part of a receiver 100 comprises a quadrature detector 101 which generates an inphase signal on an output 102 and a quadrature signal on an output 103 for radio frequency signals which appear on an input 104. Each output 102, 103 is connected to a branch, an inphase signal branch 112 and a quadrature signal branch 113, that comprises the following entities connected to each other: a lowpass filter 105 with a bandwidth proportional to a chip frequency used in the CDMA system; an A/D-converter 106, a pulse matched filter 107 which is the same used in the transmitter for spectrum shaping; a downsampling unit 108 for downsampling to one sample per chip and a bank of correlators 109. Each bank of correlators generates N correlation values.

On a first output 110 of the bank of correlators 109 in the inphase signal branch 112 a first code channel inphase signal is generated and on a first output 111 of the bank of correlators 109 in the quadrature signal branch 113 a first code channel quadrature signal is generated. The two said outputs 110, 111 are combined into a pair of outputs for a first code channel $CH_1$. All other outputs of each bank of correlators are combined in the same way to form N pairs of output which correspond to N code channels. Each code channel can be combined with the same code channel obtained from another reception path.

Figure 2:
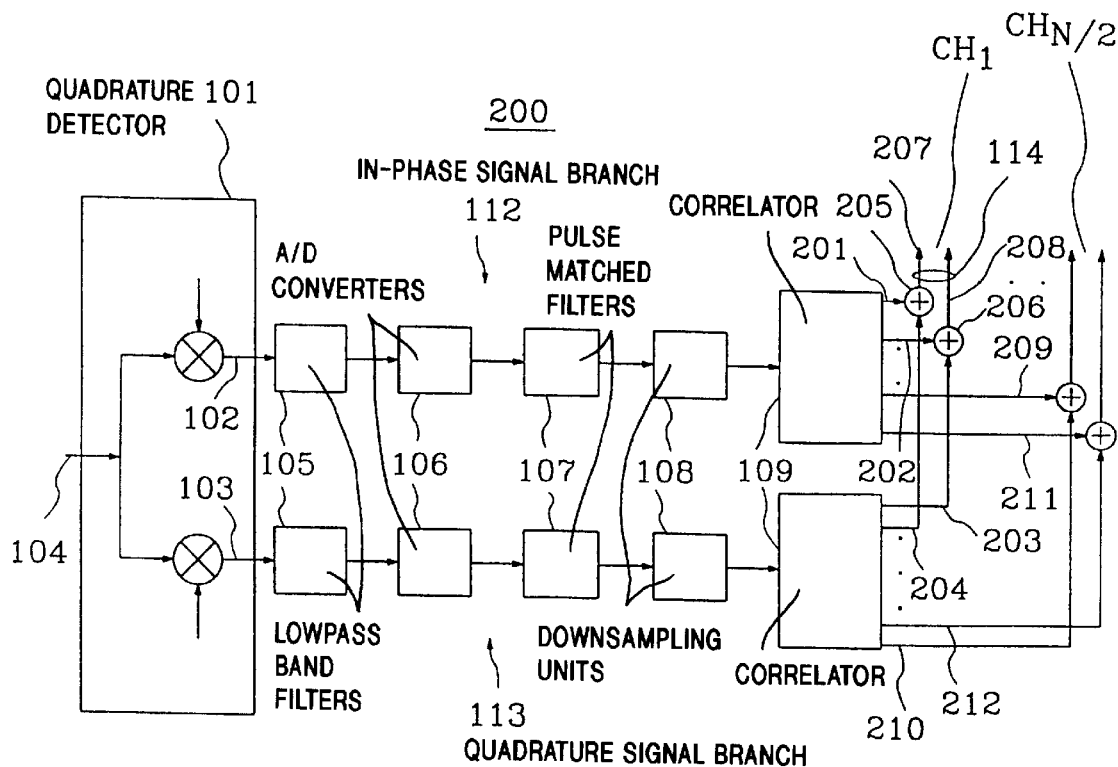
FIG. 2 is block diagram illustrating part of a receiver operable to receive a QPSK-spread signal used in a DS-CDMA system.

FIG. 2 illustrates part of another receiver 200 used in a multicode CDMA system. In a corresponding transmitter, the N transmitted code channels have been spread with a set of Orthogonal Gold sequences $G_0, G_1, \ldots, G_{N-1}$ respectively, and utilising method called QuadraPhase Shift Keying (QPSK). This method produce N/2 code channels such that each code channel is spread with two sequences in the corresponding transmitter. For example, a first code channel $CH_1$ is spread with a first Orthogonal Gold sequence $OG_0$ and a second Orthogonal Gold sequence $OG_1$.

The part of a receiver 200 comprises the same units as the part of a receiver 100 described in conjunction with FIG. 1. Due to the fact that the used utilising method is QPSK the number of the received code channels are N/2 and the arrangement of the N outputs of the banks of correlators is different than in the part of receiver 100.

A first output 201 of the bank of correlators 109 in the inphase signal branch 112 and a second output 204 of the bank of correlators in the quadrature signal branch 113 are connected to an adder 205, which is operable to adding the output signals on the outputs 201, 204. A sum is obtained as an output signal on an output 207 of the adder 205. The output signal on the output 207 is the inphase signal of the first code channel $CH_1$.

A second output 202 of the bank of correlators in the inphase signal branch 112 and a first output 203 of the bank of correlators in the quadrature signal branch 113 are connected to an adder 206, which is operable to adding the output signal on the output 202 to the output signals on the output 203. A sum is obtained as an output signal on an output 208 of the adder 206. The output signal on the output 208 is the quadrature signal of the first code channel $CH_1$. All N outputs from the two banks of correlators are arranged in the same way. This means that the N/2:th code channel is obtained with two last output of the two banks of correlators. That is, a N-1:th output of the bank of correlators in the inphase signal branch 112 and a N:th output of the bank of correlators in the quadrature signal branch 113 are connected in the same way as the output 201 and output 204 and that a N:th output of the bank of correlators in the inphase signal branch 112 and a N-1:th output of the bank of correlators in the quadrature signal branch 113 are connected in the same way as the output 211 and output 212.

The explanation for the above arrangements of the outputs of the banks of correlators can be obtained from the following simple relation, wherein the inphase signal to the bank of correlators is denoted $d_I$ and the quadrature signal is denoted $d_Q$. The first code channel has been spread with $OG_0$ and $OG_1$. Hence the following multiplication has to be performed to obtain the first code channel $CH_1$:

$$(d_I+jd_Q)(OG_0-jOG_1)=(d_IOG_0+d_QOG_1)+j(d_QOG_0+d_IOG_1).$$

The real part $(d_IOG_0+d_QOG_1)$ is what is obtained on the output 207 and the imaginary part $(d_QOG_0+d_IOG_1)$ what is obtained on the output 208. The real part and the imaginary part correspond to the inphase signal and the quadrature signal of the first code channel respectively.

The implementation of the bank of correlators does not depend on which spreading method that is used in the transmitter. The code channels are obtained by arranging the outputs of the banks of correlators in a way specific for the applied spreading method.

Figure 3:
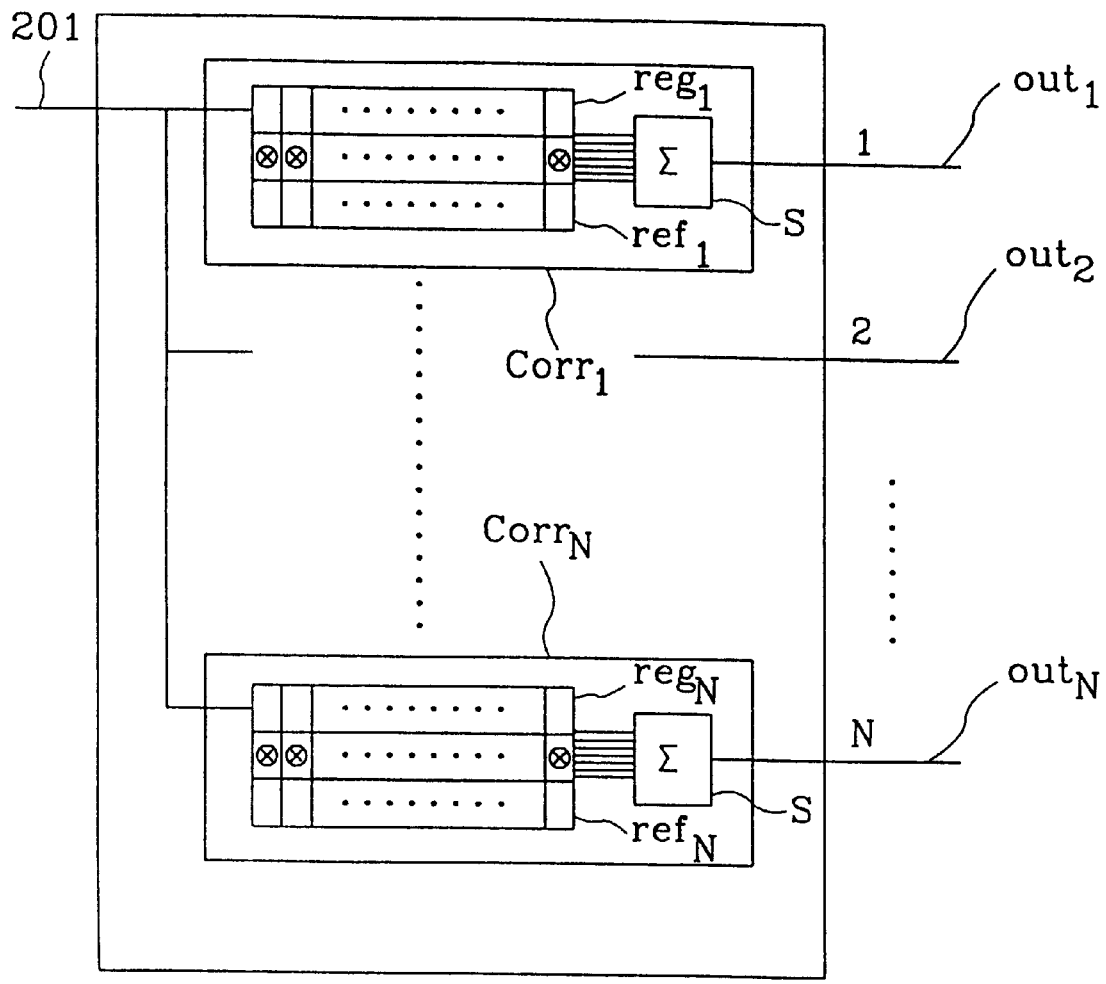
FIG. 3 is a block diagram is illustrating background art of a bank of correlators.

FIG. 3 illustrates the background art for the bank of correlators (109, FIG. 1 and FIG. 2) used for despreading multicode channels. A bank of correlators 300 comprises N correlators $Corr_1, \ldots, Corr_N$, where each correlator generates a correlation signal on output $out_1, \ldots, out_N$. Each Orthogonal Gold sequence $OG_0, \ldots, OG_{N-1}$, used for spreading the code channels in the transmitter, is stored in registers $ref_1, \ldots, ref_N$. For example, in register $ref_1$ is the Orthogonal Gold sequence $OG_0$ stored and in register $ref_N$ is the Orthogonal Gold sequence $OG_{N-1}$ stored. A sampled signal received from the downsampling unit 108 is connected to an input 201 of the bank of correlators 109. Each sample is shifted into all registers $reg_1, \ldots, reg_N$ and a multiplication is performed continuously bit-by-bit after every shift with the stored Orthogonal Gold sequence. Results of each bit multiplication are summed in summarizer S and the sum is output on the output $out_1, \ldots, out_N$ respectively as a correlation value between the Orthogonal Gold sequence and the received signal. For example, if the Orthogonal Gold sequence $OG_0$ is stored in the register $ref_1$, the bank of correlators is connected to the downsampling unit in the inphase signal branch 112, and the BPSK spreading method is used, the correlation signal on the output $out_1$ corresponds to the inphase signal of the code channel $CH_1$. With the same conditions stated above, except that the bank of correlators is connected to the quadrature signal branch 113, the quadrature signal for code channel $CH_1$ is obtained.

This implementation of the bank of correlators is inefficient. To despread all code channels it takes $N^2$ operations, which is time—and powerconsuming.

Figure 4:
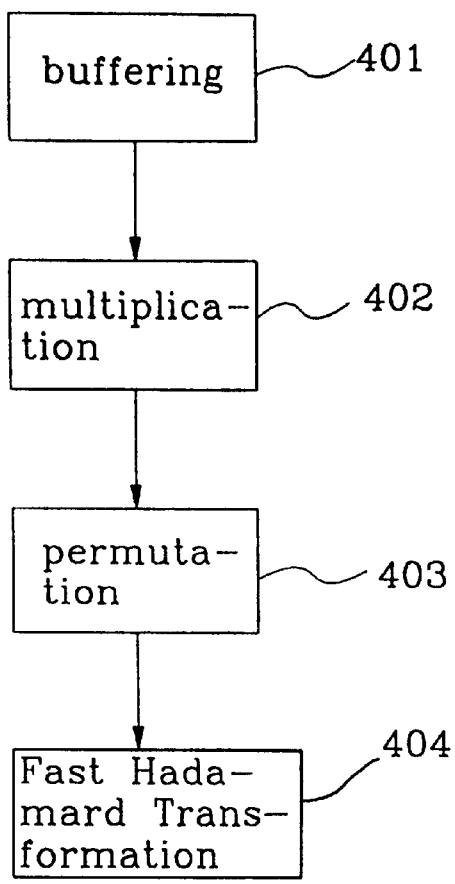
FIG. 4 is a flowchart of an embodiment of an inventive method for implementing the bank of correlators.

A flowchart, FIG. 4, illustrates an embodiment of an inventive method concerning how to implement an efficient bank of correlators used in a receiver in a multicode CDMA system. In a first step 401 N input samples $SS=s_0, s_1, \ldots, s_{N-1}$ are buffered. In a second step 402 the input samples $s_0, s_1, \ldots, s_{N-1}$ are multiplied element-by-element with a arbitrary sequence $â=a_0, a_1, \ldots, a_{N-1}$, therewith a sequence $p̂=P_0, P_1, \ldots, p_{N-1} =s_0*a_0, s_1*a_1, \ldots, s_{N-1}*a_{N-1}$ is obtained. The sequence $â$ is the same used when the Orthogonal Gold sequences $Ĝ$ are generated in the transmitter. The obtained sequence $p̂$ is then, in a third step 403, permuted in a certain way, which will be described in more detail below, in order to obtain a sequence $ŵ$, which is equal to a sum of a number of sequences from a set of so-called Walsh sequences. The sequence $ŵ$ is, in a step 404, transformed with a Fast Hadamard Transform as to obtain a set of correlation values $Ĉ=CV_0, \ldots, CV_{N-1}$ between said sequence $ŵ$ and each of N Walsh sequences. By using this inventive method for an inphase signal and for a quadrature signal it will be possible as earlier described to efficiently despread code channels used in a multicode channel system.

Figure 5:
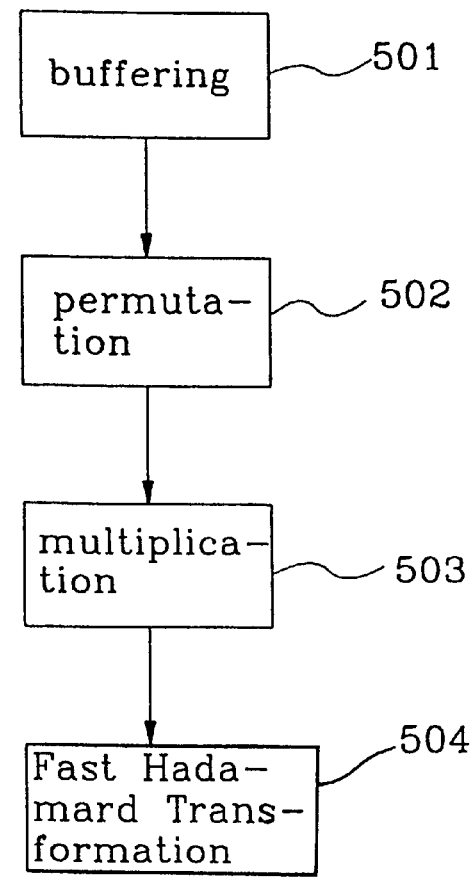
FIG. 5 is flowchart of another embodiment of the inventive method for implementing the bank of correlators.

A flowchart, FIG. 5, illustrates another embodiment of the inventive method. In a first step 501, the N input samples $SS=S_0, s_1, \ldots, s_{N-1}$ are buffered. A permutation is carried out in a certain way, described in detail below, on the buffered input samples SS in a second step 501, in order to obtain a permuted version $SS_p=s_{p0}, s_{p1}, \ldots S_{pN-1}$ of the input sequence SS. In a third step 503 the permuted version of all N input samples $S_{p0}, S_{p1}, S_{pN-1}$ are multiplied element-by-element with a permuted version $â_p=a_{p0}, a_{p1}, \ldots, a_{pN-1}$ of the sequence $â=a_0, a_1, \ldots, a_{N-1}$, therewith sequence $ŵ=w_0, W_1, \ldots, WN_{N-1} =s_{p0}*a_{p0}, s_{p1}*a_{p1}, \ldots, s_{pN-1}*a_{pN-1}$ is obtained. The sequence $â$ is permuted in a certain way, described below, before it is used. The sequence $ŵ$ is then, in a fourth step 504, transformed with the Fast Hadamard Transform as to obtain correlation values $CV_0, \ldots, CV_{N-1}$ between said sequence $ŵ$ and each of N Walsh sequences.

The permutation rule used in present invention is one which maps Orthogonal Gold codes into Walsh sequences. For each matrix $M̂$ there are many column permutations which produce the same set of Walsh sequences, but with different ordering of Walsh sequences. All these permutations are related to the natural state sequence of the appropriate linear-feedback shift register sequence generator, or equivalently, to the sequence of Galois Field $GF(2^n)$ elements $1, \alpha, \alpha^2, \ldots, \alpha^{n-2}$, where $\alpha$ is a primitive element of $GF(2^n)$. The determination of the column permutation of matrix $M̂$ will be illustrated by the following example.

If $N=2^n=8$, the m-sequence $\{X_k\}=[1\ 1\ 0\ 0\ 1\ 0]$, can be used to generate the matrix $M̂$ given by:

$$M̂ = \begin{bmatrix} 0 & 0 & 0 & 0 & 0 & 0 & 0 & 0 \\ 1 & 1 & 1 & 0 & 0 & 1 & 0 & 0 \\ 1 & 1 & 0 & 0 & 1 & 0 & 1 & 0 \\ 1 & 0 & 0 & 1 & 0 & 1 & 1 & 0 \\ 0 & 0 & 1 & 0 & 1 & 1 & 1 & 0 \\ 0 & 1 & 0 & 1 & 1 & 1 & 0 & 0 \\ 1 & 0 & 1 & 1 & 1 & 0 & 0 & 0 \\ 0 & 1 & 1 & 1 & 0 & 0 & 1 & 0 \end{bmatrix}.$$

The m-sequence $\{x_k\}$ is generated by a recursion: $X_{k+3}=X_{k+1}+X_k$ (mod 2), which is obtained from the primitive polynomial: $f((x)=^3+x+1$ over GF (2). The initial three values for the recursion, or equivalently, the initial state of the linear-feedback shift register sequence generator, are taken to be:

$[x_1\ x_2\ x_3\ ]=[1\ 1\ 1].$

The primitive polynomial defines the extended Galois Field GF ($2^3$) whose elements ordered into the sequence of the successive powers of a primitive element α are given in the following table 1.

TABLE 1

| Field elements | Decimal value | Position | Basic Permutation (of position) | Permuted Decimal Values |
|---|---|---|---|---|
| [0 0 1] = $\alpha^0$ | 1 | 1 | 8 | 0 |
| [0 1 0] = $\alpha^1$ | 2 | 2 | 1 | 1 |
| [1 0 0] = $\alpha^2$ | 4 | 3 | 2 | 2 |
| [0 1 1] = $\alpha^3$ | 3 | 4 | 4 | 3 |
| [1 1 0] = $\alpha^4$ | 6 | 5 | 3 | 4 |
| [1 1 1] = $\alpha^5$ | 7 | 6 | 7 | 5 |
| [1 0 1] = $\alpha^6$ | 5 | 7 | 5 | 6 |
| [0 0 0] | 0 | 8 | 6 | 7 |

The basic column permutation which maps M-transform matrix into the matrix whose rows are different Walsh functions is obtained by reordering the sequence of Galois field elements so that their decimal values are linearly ranging from 0 to 7.

Reordering the positions of columns of matrix $\hat{M}$ according to the basic permutation p=[1 2 4 3 7 5 6] produces the new matrix given in table 2. The rows of this matrix are Walsh functions, so by suitable permutation of rows this matrix can be transformed onto Sylvester-type Hadamard matrix. The Sylvester-type Hadamard matrix H of order 8 is given in table 3. The rows of H are Walsh sequences designated as W0 to W7.

TABLE 2

| Permuted Matrix $\hat{M}$ | Walsh Function |
|---|---|
| 0 0 0 0 0 0 0 0 | =W0 |
| 0 1 1 0 1 0 0 1 | =W7 |
| 0 1 1 0 0 1 1 0 | =W3 |
| 0 1 0 1 0 1 0 1 | =W1 |
| 0 0 0 0 1 1 1 1 | =W4 |
| 0 0 1 1 0 0 1 1 | =W2 |
| 0 1 0 1 1 0 1 0 | =W5 |
| 0 0 1 1 1 1 0 0 | =W6 |

TABLE 3

| Sylvester-type Hadamard Matrix | Walsh Function |
|---|---|
| 0 0 0 0 0 0 0 0 | =W0 |
| 0 1 0 1 0 1 0 1 | =W1 |
| 0 0 1 1 0 0 1 1 | =W2 |
| 0 1 1 0 0 1 1 0 | =W3 |
| 0 0 0 0 1 1 1 1 | =W4 |
| 0 1 0 1 1 0 1 0 | =W5 |
| 0 0 1 1 1 1 0 0 | =W6 |
| 0 1 1 0 1 0 0 1 | =W7 |

Besides the basic permutation, there are many other permutations which will produce the same set of Walsh functions. They can be obtained by applying the same principle from the previous example to the transformed matrix of $GF(2^n)$ elements, obtained by any combination of the following operations: columns permutation of field elements, and cyclic shift of 1, α, $\alpha^2$, ..., $\alpha^{n-2}$ sequence. The total number of permutations which can be obtained in this way, for the Orthogonal Gold sequences of length $N=2^n$, is M=n!×(N−1).

However, the total number of permutations is even larger, what can be seen if the transformed matrix of $GF(2^n)$ elements is defined most generally. Namely, the rotation of any column corresponding to the nonzero $GF(2^n)$ elements in the field elements matrix, that produces all different decimal values, will result in a additional permutation for matrix $\hat{M}$. In that way, for example, it can be obtained 168 permutations for n=3, which is 4 times larger than 3!×(8−1). For n=4, it can be found 56×4!×(16−1) permutations.

The following example illustrates permutation construction using transformed matrix of Galois Field elements. If the first and second column of the field elements in table 1 have exchanged the position, another permutation can be obtained as shown in table 4.

TABLE 4

| Field elements | Decimal value | Position | Basic Permutation (of position) | Permuted Decimal Values |
|---|---|---|---|---|
| [0 0 1] = $\alpha^0$ | 1 | 1 | 8 | 0 |
| [1 0 0] = $\alpha^2$ | 4 | 2 | 1 | 1 |
| [0 1 0] = $\alpha^1$ | 2 | 3 | 3 | 2 |
| [1 0 1] = $\alpha^6$ | 5 | 4 | 7 | 3 |
| [1 1 0] = $\alpha^4$ | 6 | 5 | 2 | 4 |
| [1 1 1] = $\alpha^5$ | 7 | 6 | 4 | 5 |
| [0 1 1] = $\alpha^3$ | 3 | 7 | 5 | 6 |
| [0 0 0] | 0 | 8 | 6 | 7 |

The permutation when applied to the matrix $\hat{M}$ will produce another matrix containing the set of Walsh functions, as shown able 5.

TABLE 5

| Permuted Matrix $\hat{M}$ | Walsh Function |
|---|---|
| 0 0 0 0 0 0 0 0 | =W0 |
| 0 1 1 0 1 0 0 1 | =W7 |
| 0 1 0 1 1 0 1 0 | =W5 |
| 0 1 0 1 0 1 0 1 | =W1 |
| 0 0 1 1 0 0 1 1 | =W2 |
| 0 0 0 0 1 1 1 1 | =W4 |
| 0 1 1 0 0 1 1 0 | =W3 |
| 0 0 1 1 1 1 0 0 | =W6 |

Figure 6:
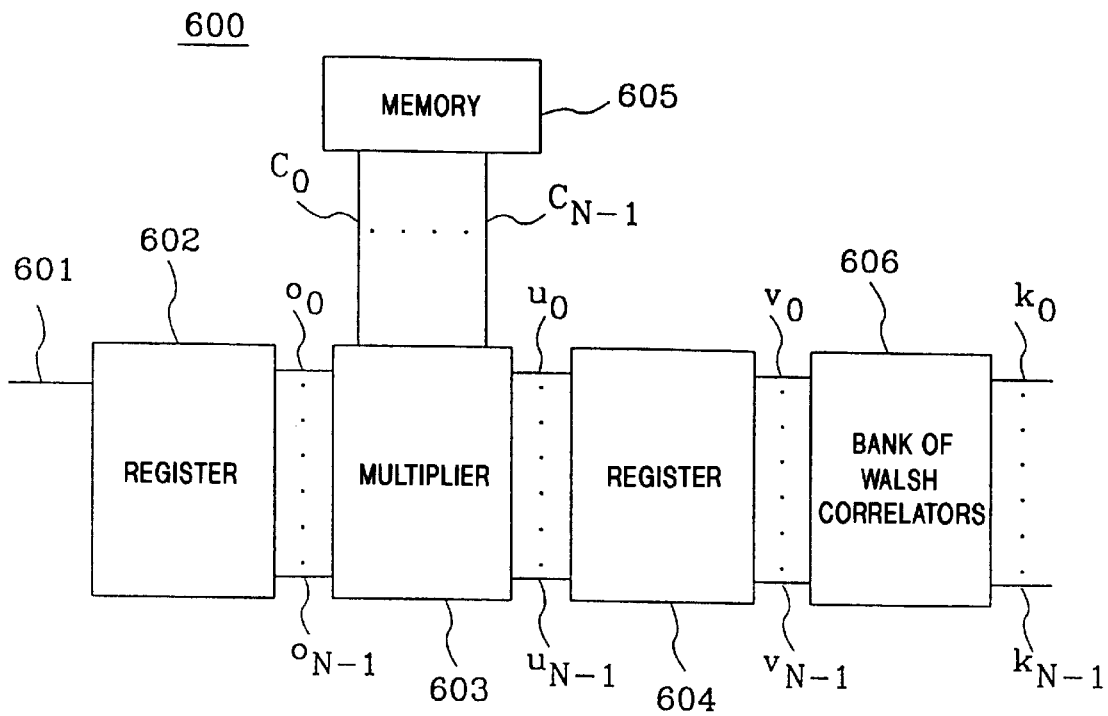
FIG. 6 is a block diagram illustrating an embodiment of an inventive arrangement of the bank of correlators.

FIG. 6 illustrates an embodiment of an inventive arrangement of the efficient bank of correlators 600 used in a receiver in a multicode CDMA system. A first register 602 converts serially received, on an input 601, input samples SS=$s_0, s_1, \ldots, s_{N-1}$ to parallel. N serially received input samples SS are output on N parallel output $o_0, o_1, \ldots, o_{N-1}$ to a multiplier 603. The arbitrary sequence $\hat{a}=a_0, a_1, \ldots, a_{N-1}$ is stored in a memory 605 which has connections $c_0, c_1, \ldots, c_{N-1}$ to the multiplier 603. Each element $a_0, a_1, \ldots, a_{N-1}$ is output on a corresponding connection $c_0, c_1, \ldots, c_{N-1}$ and multiplied in the multiplier 603 with a corresponding input sample $s_0, s_1, \ldots, s_{N-1}$ therewith the product $\hat{p}=p_0, p_1, \ldots, p_{N-1} = s_0 a_0, s_1 * a_1, \ldots, s_{N-1} * a_{N-1}$ is obtained. Output $\hat{u}=u_0, u_1, \ldots, u_{N-1}$ of the multiplier are connected to a second register 604 in which the permutation is performed. The obtained permuted version of the product $\hat{p}$ is the sequence $\hat{w}$, which is equal to the sum of a number of sequences of the so-called Walsh sequences. The elements $w_0, w_1, \ldots, w_{N-1}$ of the sequence $\hat{w}$ are, via a corresponding connection $v_0, v_1, \ldots, v_{N-1}$, connected to a bank of Walsh correlators 606, implemented as Fast Hadamard Transformer, which generates on output $k_0, k_1, \ldots, k_{N-1}$ the correlation values $CV_0, \ldots, CV_{N-1}$ corresponding to each Walsh sequence $w_0, w_1, \ldots, w_{N-1}$.

Figure 7:
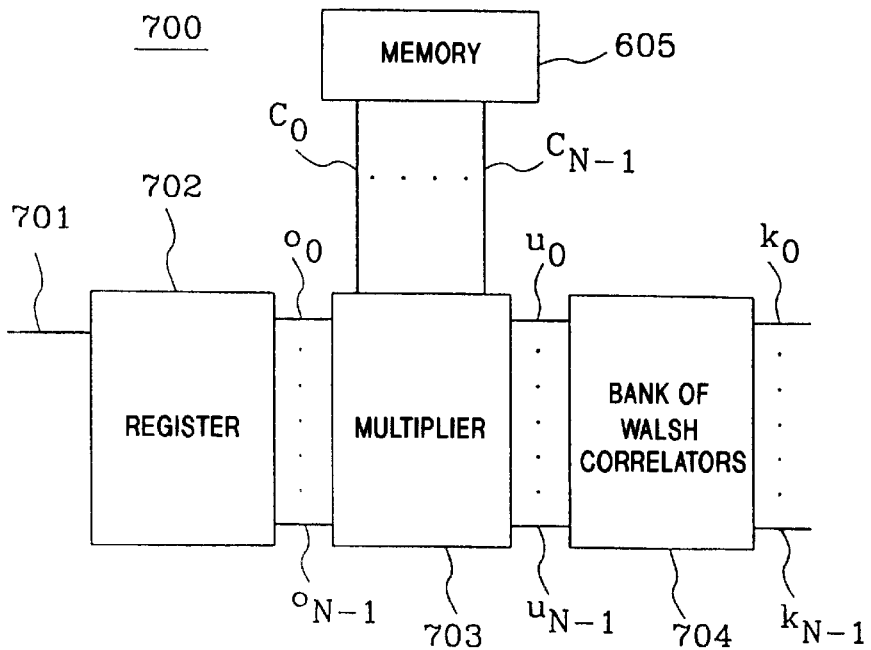
FIG. 7 is a block diagram illustrating another embodiment of the inventive arrangement of the bank of correlators.

FIG. 7 illustrates another embodiment of the inventive arrangement 700. A first register 702 converts serially received, on an input 701, input samples SS=$s_0, s_1, \ldots, s_{N-1}$ to parallel. The register 702 is also arranged so that N serially received input samples SS are permuted and output on N parallel output $o_0, o_1, \ldots, s_{N-1}$ to a multiplier 703. The permuted arbitrary sequence $\hat{a}_p = a_{p0}, a_{p1}, \ldots, a_{pN-1}$ is stored in a memory 605 which for each N elements has a connection $c_0, \ldots, c_{N-1}$ to the multiplier 703. Each element $a_{p0}, a_{p1}, \ldots, a_{pN-1}$ is output on the corresponding connection $c_0, \ldots, c_{N-1}$ and multiplied in the multiplier 703 with a corresponding input sample $s_{p0}, s_{p1}, \ldots, s_{pN-1}$, therewith the products $s_{p0}*a_{p0}, s_{p1}*a_{p1}, \ldots, s_{pN-1}*a_{pN-1}$ are obtained, which form a sequence, which is the sum of a number of sequences, from the set of Walsh sequences. Outputs $u_0, u_1, \ldots U_{N-1}$ of the multiplier 703 are connected to a bank of Walsh correlators 704, implemented as Fast Hadamard Transformer. The bank of Walsh correlators 704 comprises a buffer for buffering said products $s_{p0}*a_{p0}, s_{p1}*a_{p1}, \ldots, s_{pN-1}*a_{pN-1}$ before the Fast Hadamard Transformation is performed on said products. For the sequence $s_{p0}*a_{p0}, s_{p1}*a_{p1}, \ldots, s_{pN-1}*a_{pN-1}$ the bank of Walsh correlators 704 generates N correlation values $CV_0, \ldots, CV_{N-1}$ corresponding to each of N Walsh sequences.

The mentioned Fast Hadamard Transform, which is known by a person skilled in the art, is a method to increase the efficiency of Hadamard transform. The Hadamard transform is characterised by a Hadamard matrix, in which each row of the Hadamard matrix is orthogonal to every other row of the matrix.

Each row of the Hadamard matrix can be referred to as a Walsh sequence.

A Hadamard matrix of order n can be defined recursively as follows:

$$H_{2n} = \begin{bmatrix} H_n & H_n \\ H_n & -H_n \end{bmatrix}.$$

The Fast Hadamard transform exploit the fact that Hadamard matrices are real, symmetric and row-wise orthogonal. Since the Hadamard matrices contain only +1 values, no multiplications are required in the transform calculation. Moreover the number of additions and subtractions required can be reduced from $n^2$ to $n \times \log_2 n$, due to the fact that a Hadamard matrix of order n ($H_n$) can be written as a product of n sparse matrices, that is, $H_n = \tilde{H}_n^{\log_2(n)}$
where $$\tilde{H}_n = \begin{bmatrix} 1 & 1 & 0 & 0 & \ldots & \ldots & \ldots & \ldots \\ 0 & 0 & 1 & 1 & \ldots & \ldots & \ldots & \ldots \\ \ldots & \ldots & \ldots & \ldots & \ldots & \ldots & \ldots & \ldots \\ \ldots & \ldots & \ldots & \ldots & \ldots & \ldots & \ldots & \ldots \\ 0 & 0 & \ldots & \ldots & \ldots & \ldots & 1 & 1 \\ 1 & -1 & 0 & 0 & \ldots & \ldots & \ldots & \ldots \\ 0 & 0 & 1 & -1 & \ldots & \ldots & \ldots & \ldots \\ \ldots & \ldots & \ldots & \ldots & \ldots & \ldots & \ldots & \ldots \\ \ldots & \ldots & \ldots & \ldots & \ldots & \ldots & \ldots & \ldots \\ \ldots & \ldots & \ldots & \ldots & \ldots & \ldots & 1 & -1 \end{bmatrix}.$$

Noting that the top n/2 rows and the bottom n/2 rows contain only two nonzero terms per row, the transformation $H_n = \tilde{H}_n^{\log_2(n)} \times \hat{u} = \tilde{H}_n \times \tilde{H}_n \times \hat{u}$ can be accomplished by operating $\tilde{H}_n \times \log_2 n$ times on u, where u is a column vector of the input sample.

Due to the structure of $\tilde{H}_n$ only n additions or subtractions are required each time $\tilde{H}_n$ operates on a vector, giving a total of $n \times \log_2 n$ additions and subtractions.

The inventive method and arrangement described in conjunction with the figures require $2 \times N + N \times \log_2 N$ operations when despreading N samples. It is assumed that multiplication as well as permutation are performed in N operations. The mapping between the ordinal numbers of despreader outputs and ordinal numbers of code channels requires in principle an additional permutation of Fast Hadamard Transform outputs. However, the amount of corresponding additional processing power depends of the actual implementation. For example, if despread code channels are further processed in parallel, the hard-wired connection between despreader outputs and the rest of the receiver can be permuted, so no additional processing power is required.

As an example, if N=64, then 512 (O(64)=512) operations are required. Compared with 4096 (64×64) operations required by a straightforward implementation, 8 times reduction of the complexity is obtained.

The earlier described inventive method and arrangement do not have to operate in parallel. They can of course operate serially but they are then less efficient.

The embodiments described above serve merely as illustration and not as limitation. It will be apparent to one ordinary skill in the art that departures may de made from the embodiments described above without departing from the spirit and scope of the invention. Therefore, the invention should not be regarded as being limited to the examples described, but should instead be regarded as being equal in scope to the following claims.

What is claimed is:

1. A method of despreading a symbol sequence ($s_0, s_1, \ldots, s_{N-1}$) to obtain a number of correlation values ($CV_0, \ldots, CV_{N-1}$), where said symbol sequence has been spread by a set of Orthogonal Gold sequences ($\hat{G}$), which have been generated by means of an arbitrary sequence ($a_0, a_1, \ldots, a_{N-1}$), comprising the following steps:

a) multiplying element-by-element said symbol sequence ($s_0, s_1, \ldots, s_{N-1}$) with said arbitrary sequence ($a_0, a_1, \ldots, a_{N-1}$), in order to obtain a set of products ($s_0*a_0, s_1*a_1, \ldots, s_{N-1}*a_{N-1}$);

b) permuting said set of products ($s_0*a_0, s_1*a_1, \ldots, s_{N-1}*a_{N-1}$) in order to obtain a sequence ($\hat{w}$) equal to a sum of a number of sequences from a set of Walsh sequences;

c) transforming said sequence ($\hat{w}$) with a Fast Hadamard Transform to obtain said correlation values ($CV_0, \ldots, CV_{N-1}$).

2. A method according to claim 1, wherein the element-by-element multiplications are performed in parallel and the method further comprises the step of performing a serial to parallel conversion on said symbol sequence ($s_0, s_1, \ldots, s_{N-1}$).

3. A method according to claim 1, wherein the element-by-element multiplications are performed serially and the method further comprises buffering said symbol sequence ($s_0, s_1, \ldots, s_{N-1}$).

4. A method according to claim 1, wherein said arbitrary sequence ($a_0, a_1, \ldots, a_{N-1}$) is a maximal-length PN sequence.

5. A method of despreading a symbol sequence ($s_0, s_1, \ldots, s_{N-1}$) to obtain a number of correlation values ($CV_0, \ldots, CV_{N-1}$), where said symbol sequence has been spread by a set of Orthogonal Gold sequences ($\hat{G}$), which have been generated by means of an arbitrary sequence ($a_0, a_1, \ldots, a_{N-1}$), comprising the following steps:

a) permuting said symbol sequence ($s_0, s_1, \ldots, s_{N-1}$), according to a certain rule in order to obtain a permuted version ($s_{p0}, s_{p1}, \ldots, s_{pN-1}$) of the symbol sequence;

b) permuting said arbitrary sequence $(a_0, a_1, \ldots, a_{N-1})$, according to the certain rule in order to obtain a permuted version $(a_{p0}, a_{p1}, \ldots, a_{pN-1})$ of the arbitrary sequence;

c) multiplying element-by-element said permuted version $(s_{p0}, s_{p1}, \ldots, s_{pN-1})$ of the symbol sequence with said permuted version $(a_{p0}, a_{p1}, \ldots, a_{pN-1})$ of the arbitrary sequence, to obtain a sequence $(\hat{w})$ equal to a sum of a number of sequences from a set of Walsh sequences;

d) transforming said sequence $(\hat{w})$ with a Fast Hadamard Transform to obtain said correlation values $(CV_0, \ldots, CV_{N-1})$.

6. A method of despreading a first symbol sequence $(s_0, s_1, \ldots, s_{N-1})$ to obtain a number of code channels $(CH_0, CH_1, \ldots, CH_M)$ from an incoming code spread radio signal, which is quadrature detected to obtain an inphase signal and a quadrature signal, comprising the following steps:

correlating said inphase signal to obtain N inphase correlation values by performing the steps of;

sampling the inphase signal to obtain a second symbol sequence; multiplying the second symbol sequence element-by-element with an arbitrary sequence to obtain a first set of products;

permuting the first set of products to obtain a first permuted sequence that is equal to a sum of a number of sequences from a set of Walsh sequences; and transforming the first permuted sequence with a Fast Hadamard Transform;

correlating said quadrature signal to obtain N quadrature correlation values by performing the steps of;

sampling the quadrature signal to obtain a third symbol sequence;

multiplying the third symbol sequence element-by-element with the arbitrary sequence to obtain a second set of products;

permuting the second set of products to obtain a second permuted sequence that is equal to a sum of a number of sequences from a set of Walsh sequences; and transforming the second permuted sequence with a Fast Hadamard Transform; and arranging said inphase correlation values and said quadrature correlation values according to a corresponding spreading method, therewith to obtain said code channels $(CH_0, CH_1, \ldots, CH_M)$ from an incoming code spread radio signal, which is quadrature detected to obtain an inphase signal and a quadrature signal;

wherein the first symbol sequence has been spread using a set of Orthogonal Gold sequences generated using the arbitrary sequence.

7. A method according to claim 6, wherein:

said spreading method is Binary Phase Shift Keying (BPSK) spreading, and the number of obtained code channels $(CH_0, CH_1, \ldots, CH_M)$ is equal to the number of obtained correlation values.

8. A method according to claim 6, wherein:

said spreading method is QuadraPhase Shift Keying (QPSK) spreading, and the number of obtained code channels $(CH_0, CH_1, \ldots, CH_M)$ is equal to half of the number of the obtained correlation values.

9. A method of despreading a first symbol sequence $(s_{p0}, s_{p1}, \ldots, s_{pN-1})$, to obtain a number of code channels $(CH_0, CH_1, \ldots, CH_M)$ from an incoming code spread radio signal, which is quadrature detected to obtain an inphase signal and a quadrature signal, comprising the following steps:

correlating said inphase signal to obtain N inphase correlation values by performing the steps of;

sampling the inphase signal to obtain a second symbol sequence;

permuting the second symbol sequence according to a first rule in order to obtain a permuted version of the second symbol sequence;

permuting an arbitrary sequence according to the first rule in order to obtain a permuted version of the arbitrary sequence;

multiplying the permuted version of the second symbol sequence with the permuted version of the arbitrary sequence element-by-element to obtain a first multiplied sequence that is equal to a sum of a number of sequences from a set of Walsh sequences; and transforming the first multiplied sequence with a Fast Hadamard Transform;

correlating said quadrature signal to obtain N quadrature correlation values by performing the steps of;

sampling the quadrature signal to obtain a third symbol sequence;

permuting the third symbol sequence according to a second rule in order to obtain a permuted version of the third symbol sequence;

permuting the arbitrary sequence according to the second rule in order to obtain a permuted version of the arbitrary sequence;

multiplying the permuted version of the third symbol sequence with the permuted version of the arbitrary sequence element-by-element to obtain a second multiplied sequence that is equal to a sum of a number of sequences from a set of Walsh sequences; and transforming the second multiplied sequence with a Fast Hadamard Transform;

arranging said inphase correlation values and said quadrature correlation values according to a corresponding spreading method, therewith to obtain said code channels $(CH_0, CH_1, \ldots, CH_M)$;

wherein the first symbol sequence has been spread using a set of Orthogonal Gold sequences generated using the arbitrary sequence.

10. An arrangement of a bank of correlators for despreading a symbol sequence $(s_0, s_1, \ldots, s_{N-1})$ to obtain a number of code channels $(CH_0, CH_1, \ldots, CH_{N-1})$, where the code channels have been spread by a set of Orthogonal Gold sequence $(\hat{G})$, which have been generated by means of an arbitrary sequence $(a_0, a_1, \ldots, a_{N-1})$ said arrangement comprising:

means for permuting the symbol sequence $(s_0, s_1, \ldots, s_{N-1})$ according to a certain rule, in order to obtain a permuted version $(s_{p0}, s_{p1}, \ldots, s_{pN-1})$ of the symbol sequence;

means for permuting the arbitrary sequence $(a_0, a_1, \ldots, a_{N-1})$ according to the certain rule, in order to obtain a permuted version $(a_{p0}, a_{p1}, \ldots, a_{pN-1})$ of the arbitrary sequence;

means for multiplying element-by-element said permuted version $(s_{p0}, s_{p1}, \ldots, s_{pN-1})$ of the symbol sequence with said permuted version $(a_{p0}, a_{p1}, \ldots, a_{pN-1})$ of the arbitrary sequence to obtain a sequence $(\hat{w})$ which is a sum of a number of sequences from a set of Walsh sequences; and at least one bank of Walsh correlators, implemented as a Fast Hadamard Transformer, operable to transform said sequence ($\hat{w}$) to obtain correlation values ($CV_0, \ldots, CV_{N-1}$).

11. An arrangement of a bank of correlators for despreading a symbol sequence ($s_0, s_1, \ldots, s_{N-1}$) to obtain a number of code channels ($CH_0, CH, \ldots, CH_{N-1}$), where the code channels have been spread by a set of Orthogonal Gold sequences ($\hat{G}$), which have been generated by means of an arbitrary sequence ($a_0, a_1, \ldots, a_{N-1}$), said arrangement comprising:

means for multiplying element-by-element said symbol sequence ($s_0, s_1, \ldots, s_{N-1}$) with said arbitrary sequence ($a_0, a_1, \ldots, a_{N-1}$) to obtain a set of products ($s_0{}^*a, s_1{}^*a_1, \ldots, s_{N-1}{}^*a_{N-1}$);

means for permuting said set of products ($s_0{}^*a_0, s_1{}^*a_1, \ldots, s_{N-1}{}^*a_{N-1}$) according to a certain rule, in order to obtain a sequence ($\hat{w}$) which is a sum of a number of sequences from a set of Walsh sequences; and at least one bank of Walsh correlators, implemented as a Fast Hadamard Transformer, operable to transform said sequences ($\hat{w}$) to obtain correlation values ($CV_0, \ldots, CV_{N-1}$).

* * * * *